(No Model.)
J. E. WINDLE.
Cloth-Measuring Machine.
No. 230,381. Patented July 20, 1880.
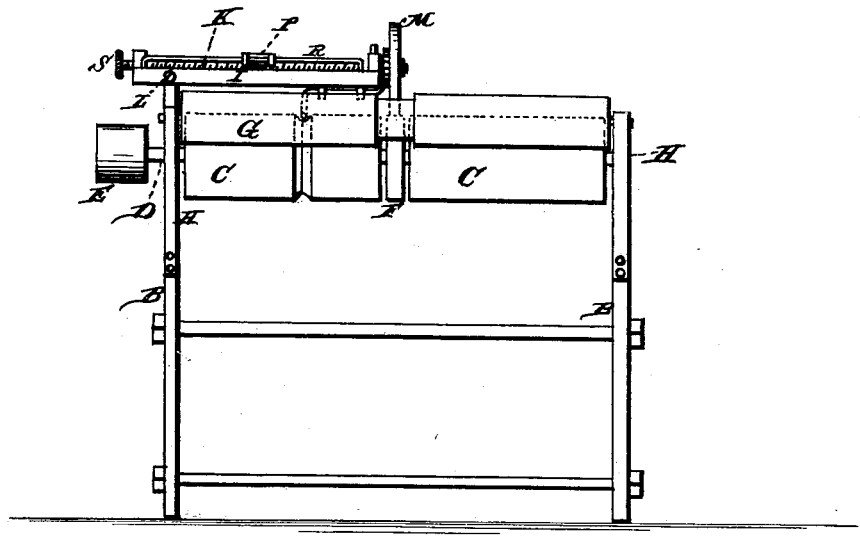
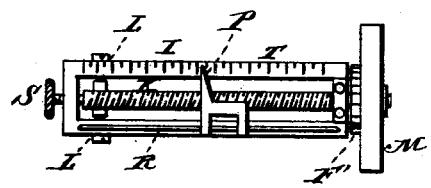
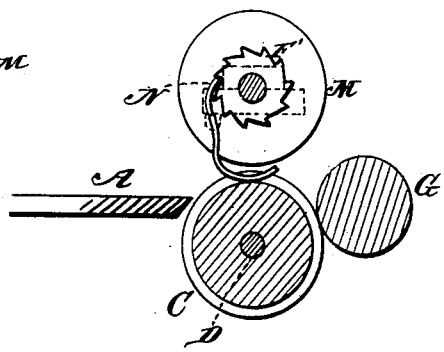

United States Patent Office.

JOHN E. WINDLE, OF MILLVILLE, MASSACHUSETTS.

CLOTH-MEASURING MACHINE.

SPECIFICATION forming part of Letters Patent No. 230,381, dated July 20, 1880.

Application filed April 5, 1880. (No model.)

*To all whom it may concern:*

Be it known that I, JOHN E. WINDLE, of Millville, in the county of Worcester and State of Massachusetts, have invented certain new and useful Improvements in Cloth-Measuring Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a rear elevation of my cloth-measuring machine, and Figs. 2 and 3 are detail views of the same.

The invention relates to a cloth-measuring device; and the improvement consists in the novel features of construction and combination hereinafter set forth and claimed.

Upon the shaft of two rollers a third roller is loosely mounted, and bearing upon this loose roller is a wheel of a screw-threaded shaft. The screw-threaded shaft is journaled in a hinged frame, and by the rotation of the said shaft a marker or indicator is caused to travel along it and mark the quantity of cloth or other fabric drawn between the loose roller and the roller of the hinged frame, said marking or measuring being effected by a scale upon the hinged frame, to which scale the indicator points.

A designates the cloth-table, which is supported by the standards B; and C C represent two rollers secured at a short distance apart upon a shaft, D, which has a driving pulley-wheel, E. Between the rollers C C a roller, F, is loosely mounted upon the shaft D; and to one side of the roller C is arranged a roller, G, which has the bearings of its axis at the upper ends of springs H, which are secured to the standards B, so as to bring the roller G against the rollers C C.

The frame I, which carries the screw-threaded shaft K, is hinged at one end, as at L; and to one end of the shaft K is secured a wheel, M, which rests upon the loosely-mounted roller F.

F' is a ratchet alongside of the wheel M; and N is a pawl, one end of which engages with the ratchet, while its remaining end is bent to form an arm, which rests in a groove of one of the rollers G.

The index or pointer P slides upon a rod, R, which is secured to the hinged frame, and this index rests upon the screw-threaded shaft.

S is a thumb-screw passed through one end of the hinged frame, and constituting a bearing for one end of the screw-threaded shaft.

As the cloth is carried over the rollers C C and F and under the wheel M the said wheel M will be rotated, and hence a rotation of the screw-threaded shaft effected. This shaft causes the index to travel along the frame, and the index pointing to a scale, T, upon the hinged frame will indicate the number of yards, feet, or inches of cloth measured off. As the cloth is being measured the ratchet-wheel on the measuring-wheel is free to rotate; but as soon as the cloth passes from under the measuring-wheel the arm of the wheel drops into the groove of the roller. This throws the pawl into engagement with the ratchet of the measuring-wheel, and hence acts as a stop-motion as soon as the cloth leaves the roller. The object of this device is to prevent the rotation of the measuring-wheel after the cloth has been run out from under it.

What I claim is—

1. The combination of the rollers C, in a cloth-measuring machine, with a loosely-mounted roller, F, and a wheel arranged to travel over the roller F and mounted upon a screw-threaded shaft which actuates an index, substantially as set forth.

2. The combination of the cloth-table A, in a cloth-measuring machine, with rollers C F and a roller, G, with spring-supports, also a wheel arranged to rotate a screw-threaded shaft as the cloth is passed through the machine, and a sliding pointer or index arranged in connection with the screw-threaded shaft, substantially as set forth.

In testimony that I claim the above I have hereunto subscribed my name in the presence of two witnesses.

JOHN E. WINDLE.

Witnesses:
GEORGE A. WILBUR,
ROBERT ALDRICH.